United States Patent [19]
Prendergast

[11] Patent Number: 5,961,251
[45] Date of Patent: Oct. 5, 1999

[54] ARTIFICIAL SEAWEED DEVICE

[76] Inventor: Francis G. Prendergast, 142 N. Falmouth Hwy., N. Falmouth, Mass. 02556

[21] Appl. No.: 08/999,174

[22] Filed: Dec. 29, 1997

[51] Int. Cl.$^6$ .................................................. E02B 3/04
[52] U.S. Cl. ................................. 405/24; 405/23; 405/25
[58] Field of Search .................................. 405/24, 21, 15, 405/25–31, 32–35, 22, 23

[56] References Cited

U.S. PATENT DOCUMENTS

| | | |
|---|---|---|
| 4,221,500 | 9/1980 | Garrett . |
| 4,437,786 | 3/1984 | Morrisroe .................................. 405/24 |
| 4,439,058 | 3/1984 | Le Mehaute . |
| 4,478,533 | 10/1984 | Garrett ....................................... 405/24 |
| 4,490,071 | 12/1984 | Morrisroe . |
| 4,534,675 | 8/1985 | Morrisroe . |
| 4,641,997 | 2/1987 | Lauer et al. . |

FOREIGN PATENT DOCUMENTS 002670814  6/1992  France ..................................... 405/24

*Primary Examiner*—Dennis L. Taylor
*Attorney, Agent, or Firm*—O'Connell Law Firm

[57] ABSTRACT

An artificial seaweed device for submersion in a volume of water along a coastline for inhibiting coastal erosion and enhancing accretion of waterborne particulate matter. The artificial seaweed device includes elongate and flexible first and second anchor members each with an open inner volume for containing a volume of particulate anchoring material such as washed stone. The first and second anchor members, which may have oval or eye-shaped cross sections when filled with particulate anchoring material, are coupled together longitudinally to form a bipartite anchor unit with a bipartite anchor unit base width. A plurality of elongate and flexible artificial seaweed strips each have a fixed end attached to the bipartite anchor unit and a free end distal to the bipartite anchor unit. A space between adjacent artificial seaweed strips prevents entanglement. Tabs of buoyant material such as foamed ionomer resin are affixed to the free end of each of the artificial seaweed strips.

11 Claims, 5 Drawing Sheets

ARTIFICIAL SEAWEED DEVICE

FIELD OF THE INVENTION

The present invention relates generally to shoreline preservation and restoration. More particularly, it relates to an artificial seaweed device for preventing shoreline erosion and inducing the accretion of waterborne particulate matter along a shoreline.

BACKGROUND OF THE INVENTION

The shorelines of most bodies of water suffer from a nearly inevitable tendency to erode. This phenomenon commonly is most pronounced in larger bodies of water such as oceans, and it is nearly always accelerated under severe weather conditions. Although such erosion could be of little consequence in certain locations, where seacoast communities have developed and where beaches are used for recreation and leisure, an eroding shoreline can lead to unfortunate, costly, and even catastrophic results. Many communities have seen coastal erosion march irresistibly shoreward to cause buildings to founder and topple into the sea and to decimate valuable beaches.

This erosion is the unfortunate result of the natural movement of currents and waves. It has been found that an ocean's current and wave movement actually gives rise to three main processes of shoreline particulate movement. A first process has been termed bed load transportation. Bed load transportation is the movement of large sand deposits by rolling or slipping along the ocean's floor. A second process of particulate movement, saltation, occurs when particulate matter briefly jumps from the sea floor only to fall into substantially its original location. The third process of particulate movement is termed transportation by suspension. Under transportation by suspension, particulate matter is drawn from the ocean floor to become suspended in turbulent water. The ocean's moving water often carries the suspended particulate matter a significant distance, commonly away from the shore, before redepositing it on the sea floor. Transportation by suspension is the main cause of erosion.

Recognizing this, numerous inventors have developed and disclosed devices intended to stem the eroding tendency of transportation by suspension while effectively attempting to exploit the nature of the particulate movement process to accomplish the generally contrary result of enhancing the accretion of particulate matter immediately adjacent to a shoreline. Although many solutions to shoreline erosion of this type have been proposed with each purporting to solve the problems left by its predecessors, their essential concept is consistent: to provide an artificial seaweed device with at least one strip of artificial seaweed that projects upwardly from the sea floor to reduce localized turbulence and to restrict the off-shore movement of waterborne particulate matter thereby reducing shoreline erosion and enhancing particulate accretion.

Such prior art devices undeniably are laudable for their goals, and they have been effective to varying degrees. However, prior art seaweed devices have been shown to exhibit a multiplicity of disadvantages that together render the seaweed devices significantly less effective than they might be otherwise. One recognized and longstanding problem detracting from the long-term effectiveness of prior art devices has been their tendency to exhibit extensive displacement migration or movement under adverse aquatic conditions. Research has shown that prior art artificial seaweed devices originally placed in long, shore-parallel rows often were spun to an ineffective orientation or dislocated and scattered or jumbled into ineffective groups. Furthermore, many prior art devices also have exhibited a tendency to roll along the sea floor under severe weather conditions thereby effectively reeling in the artificial seaweed strips upon which the effectiveness of the inventions relies. Ironically, this dislocation and possible anchor rolling of the seaweed devices has been found to be most prevalent where sand collection potential is greatest (i.e., on sand bars, groin tips, and heavily scoured beaches.

A number of solutions to the problem of displacement migration have been proposed (i.e., synthetic seaweed matrices in U.S. Pat. No. 4,641,997 and roped-together seaweed devices in U.S. Pat. No. 4,534,675). However, the very solution provided by these inventions has been seen to create another significant problem in the form of increased difficulty and complexity of installation. Since artificial seaweed devices are installed where aquatic conditions are turbulent, difficult installation procedures, particularly those requiring scuba personnel, are less than optimal.

More simply noted but of similar significance is the recognized tendency of adjacent artificial seaweed strips in many prior art devices to become entangled with one another. Once entangled, the strips present a diminished profile which leads to a resultantly lessened reduction of localized turbulence and a less effective barrier to particulate movement. Consequently, the entangled strips often fail to accomplish their intended purposes of reducing erosion and enhancing accretion of waterborne particulate matter.

With the aforementioned disadvantages of the prior art in mind and in light of the ever-increasing damage caused by coastal erosion, it becomes clear that there is a real and significant need for an artificial seaweed device that effectively prevents erosion while enhancing accretion of waterborne particulate matter, resisting undesirable dislocation and rolling, and preventing entanglement between adjacent artificial seaweed strips.

SUMMARY OF THE INVENTION

Advantageously, the present invention has as its principal object and advantage the provision of an artificial seaweed device that prevents coastal erosion and enhances the accretion of waterborne particulate matter while effectively resisting undesirable dislocation migration and anchor rolling even under adverse aquatic conditions.

A further object of the invention is to provide an artificial seaweed device with artificial seaweed strips that prevent entanglement therebetween to preserve optimal effectiveness in reducing erosion and enhancing particulate accretion.

Still another object of the invention is to provide an artificial seaweed device with the aforementioned advantages that nonetheless may be installed simply and conveniently with little or no underwater assistance.

In accomplishing its objects, the present invention for an artificial seaweed device includes an elongate first anchor member longitudinally coupled to a second anchor member to form a bipartite anchor unit with a bipartite anchor unit base width. Each anchor member has an open inner volume for containing a volume of particulate anchoring material. A plurality of elongate and flexible artificial seaweed strips are attached at a fixed end to the bipartite anchor unit thereby leaving each seaweed strip with a free end distal to the bipartite anchor unit. A buoyancy means is operably associated with each of the plurality of seaweed strips for maintaining each of the artificial seaweed strips in a generally upright orientation when the artificial seaweed device is submerged in a volume of water.

This, the invention in its most basic form, effectively meets the basic objects of the invention by providing a bipartite anchor unit that enables the artificial seaweed device to resist displacement migration and anchor rolling in a number of ways. One significant means of resistance to undesirable movement exists immediately upon submersion and placement of the device in a volume of water while an equally significant means of resistance develops over time by an exploitation of particulate movement. Immediately upon dropping to the ocean floor, the artificial seaweed device is possessed of a bipartite anchor unit base width. Naturally, such a relatively wide bipartite anchor unit base width provides improved resistance to displacement migration deriving from its wider base width and its increased surface contact with the sea floor. Also, anchor rolling is prevented because the artificial seaweed device can begin to roll only by one anchor member being physically lifted from the sea floor and rolled over the other anchor member. Additional resistance to displacement migration has been seen to develop over time as particulate matter tends to accumulate between and around the first and second anchor members.

In preferred embodiments, the anchor members may be comprised of flexible tubes with eye shaped or oval cross sections. Anchor members with oval or eye-shaped cross sections further widen the bipartite anchor base width whereby anchor rolling and repositioning are avoided still more effectively. Anchor rolling is prevented for the still further reason that anchor members with such cross sections exhibit a lower center of gravity with a consequently greater resistance to lifting over one another. Furthermore, ovally or eye-shaped cross sectioned anchor members tend to lie more flatly on the ocean floor whereby particulate matter is able to accumulate on top of the anchor members to plant the anchor members on the sea floor.

Although the particulate anchoring material occupying the open inner volume of each of the anchor members may be any suitable material or combination of materials such as sand, dirt, sediment, or stone, it has been found that washed stone is most advantageous. With regard to amount, about sixty pounds of washed stone has been found to be most suitable. Also, although any buoyancy means capable of maintaining the artificial seaweed strips in a generally upright position in water may be used, the inventor has discovered that a tab of foamed ionomer resin affixed to the free end of each artificial seaweed strip appears ideal due to its disintegration over time. Further still, the inventor has found that tangling of adjacent artificial seaweed strips can be minimized by providing a space between adjacent strips.

Of course, one must note that additional objects and advantages of the present invention will become obvious to those skilled in the art who read this specification and view the accompanying drawings. One also should be mindful that the foregoing discussion is designed merely to broadly outline the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of possible manifestations of the invention.

DETAILED DESCRIPTION OF A PREFERRED EMBODIMENT

Figure 1:
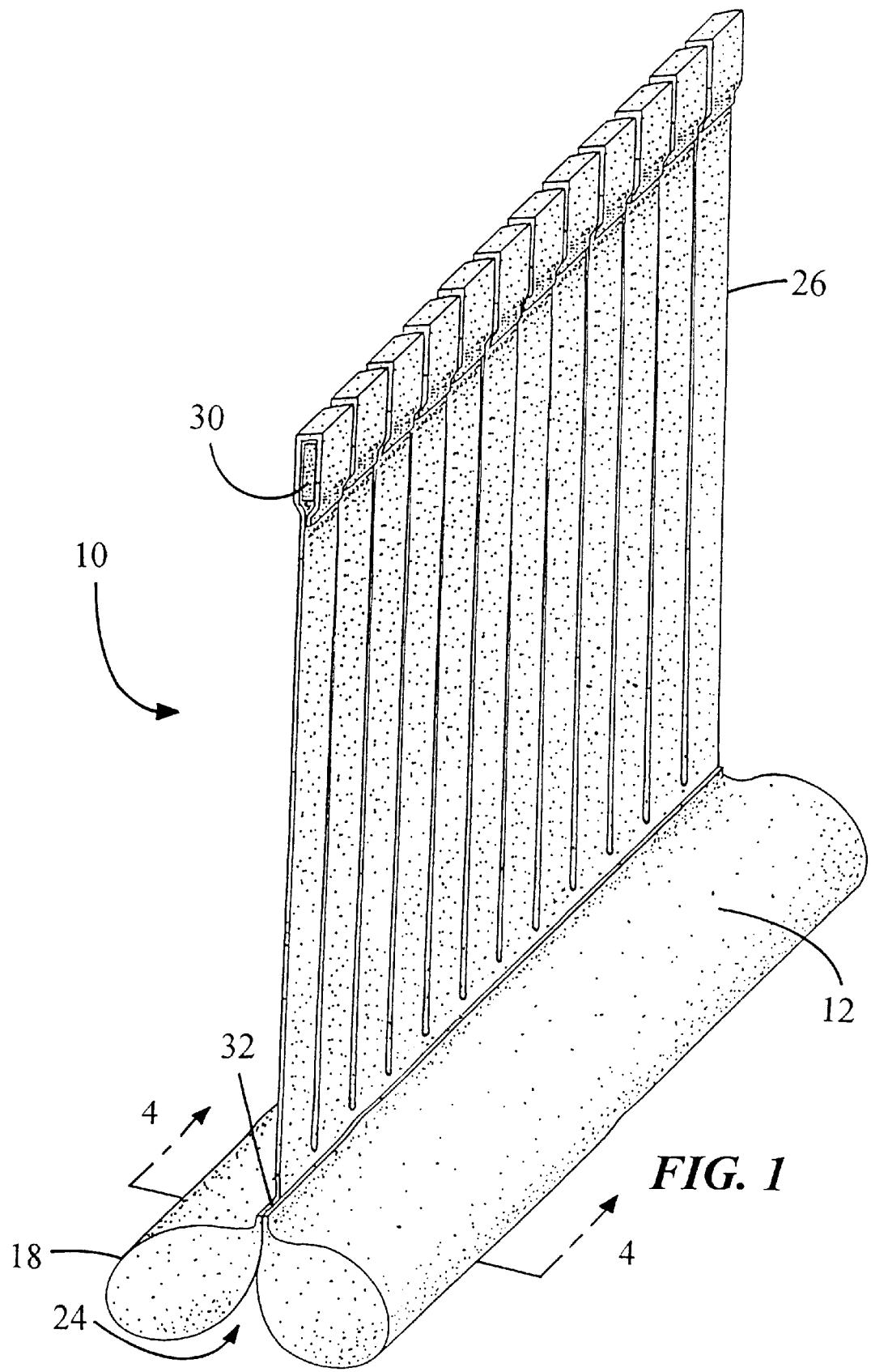
FIG. 1 is a perspective view of an artificial seaweed device embodying to the present invention.

Looking more particularly to the accompanying drawings, FIGS. 1, 2, 3, and 4 depict preferred embodiments of the present invention for an artificial seaweed device, which is indicated generally at 10 in each figure. The artificial seaweed device 10 includes an elongate, flexible, and tube-like first anchor member 12 with an open inner volume 14 for containing a volume of particulate anchoring material 16. An elongate, flexible, and tube-like second anchor member 18 with an open inner volume 20 for containing a volume of particulate anchoring material 22 is coupled longitudinally to the first anchor member 12 along a coupling line 32. The first and second anchor members 12 and 18 together form a bipartite anchor unit 24 with a bipartite anchor unit base width W.

Each of a plurality of elongate and flexible artificial seaweed strips 26 has a fixed end attached to the bipartite anchor unit 24 and a free end distal to the bipartite anchor unit 24. The plurality of artificial seaweed strips 26 are attached generally colinearly to the bipartite anchor unit 24 along the coupling line 32. Each artificial seaweed strip 26 is comprised of a strip of flexible material 28 with a buoyancy means in the form of a buoyancy tab 30 affixed to the free end of the artificial seaweed strip 26 for maintaining the artificial seaweed strip 26 in a generally upright orientation when the artificial seaweed device 10 is submerged in a volume of water 100 as is shown in FIG. 3.

The mere provision of the bipartite anchor unit 24 in and of itself provides a number of the present invention's advantages. For example, the bipartite anchor unit 24 exhibits a tremendous resistance to the displacement migration and anchor rolling tendencies that have rendered prior art artificial seaweed devices crippled and ineffective. While most prior art artificial seaweed devices have been seen to roll along the ocean floor like logs under adverse aquatic conditions, such a disadvantageous method of migration is rendered nearly impossible by the provision of the bipartite anchor unit 24 that could exhibit anchor rolling only if first and second anchor members 12 and 18 were to roll one over the other. Obviously, this would require one of the first and second anchor members 12 or 18 to be lifted off of the sea floor by the force of the moving water.

Figure 2:
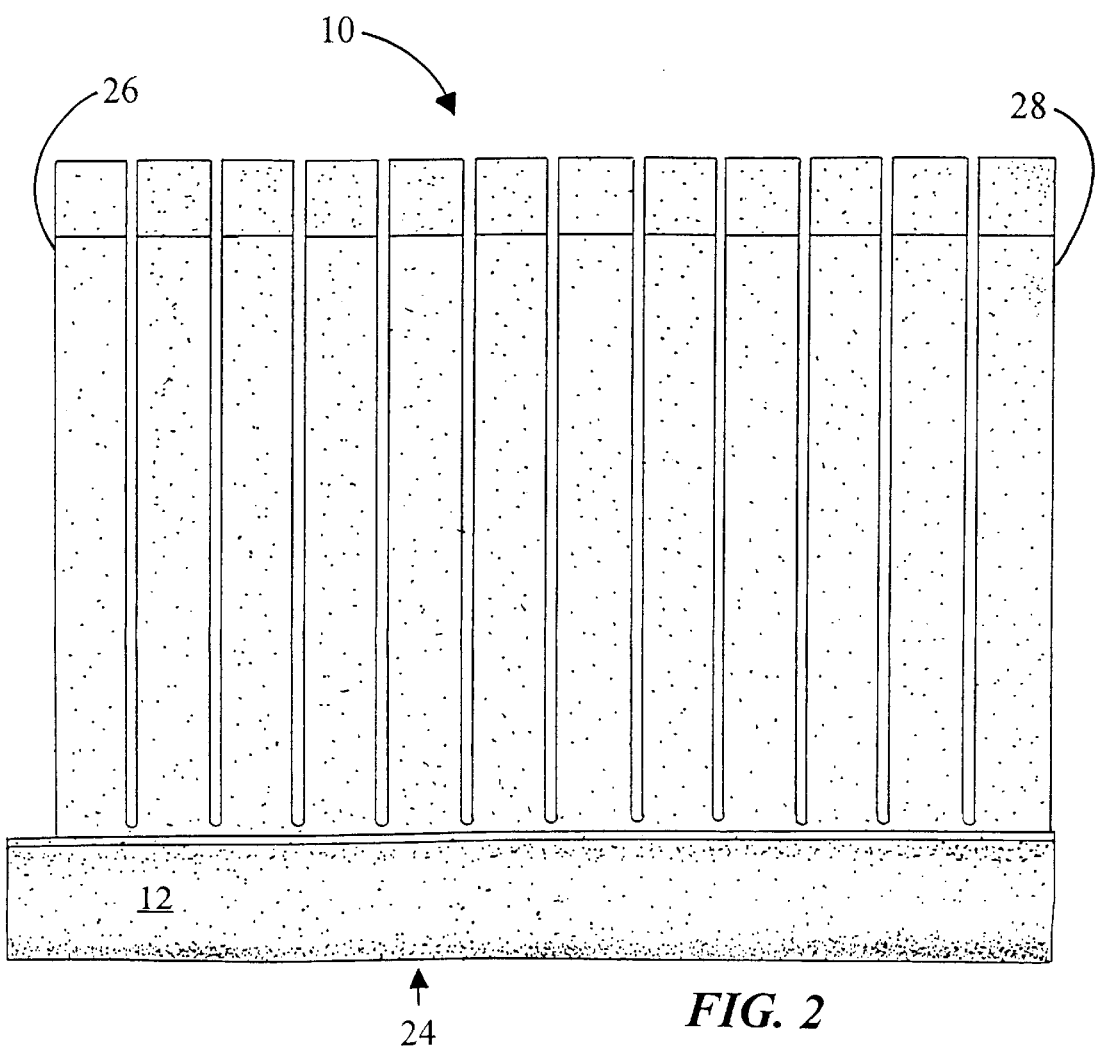
FIG. 2 is a view in front elevation of the artificial seaweed device of FIG. 1.
Figure 3:
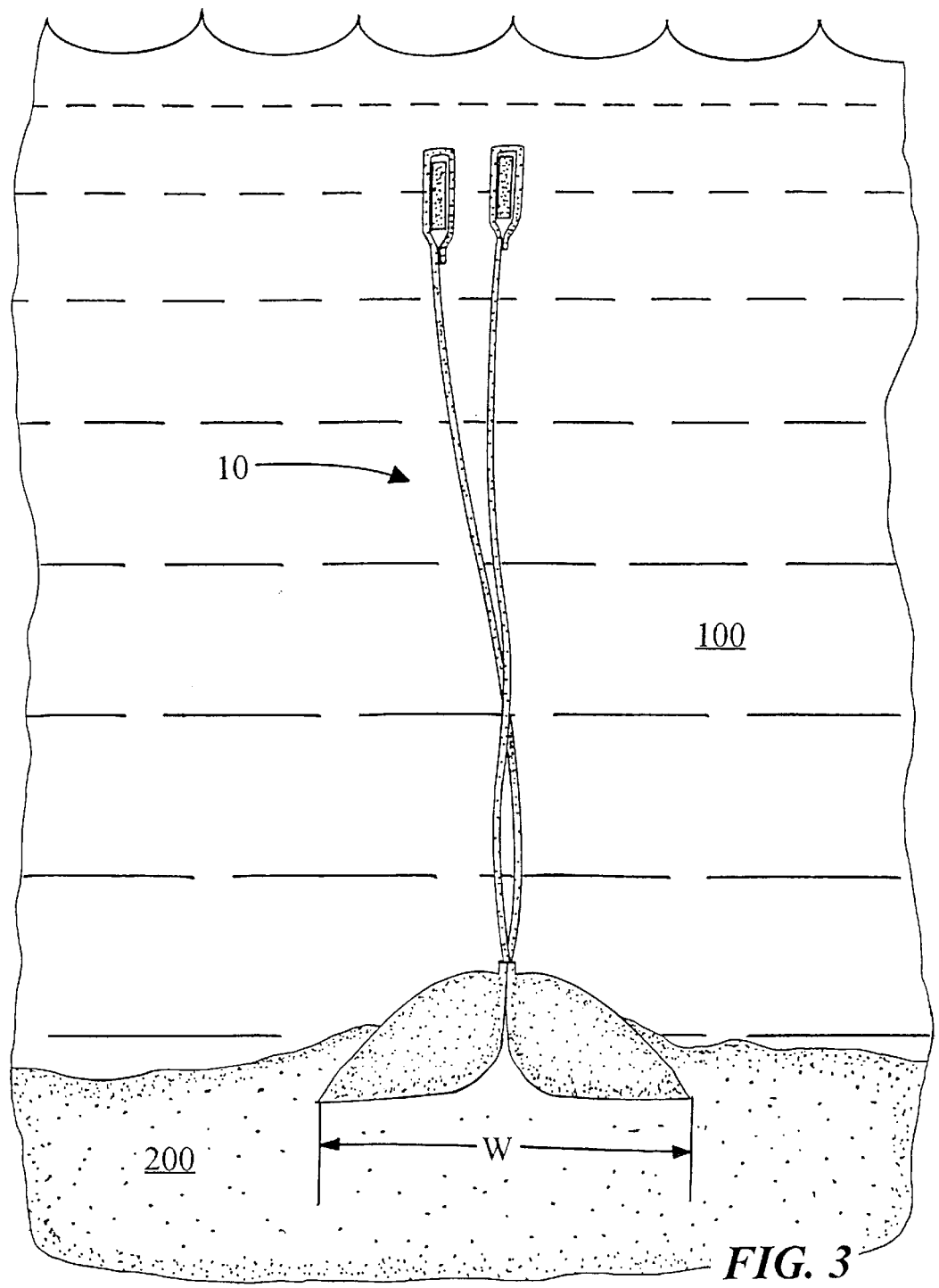
FIG. 3 is a view in side elevation of the artificial seaweed device of FIG. 1 shown in a body of water.
Figure 4:
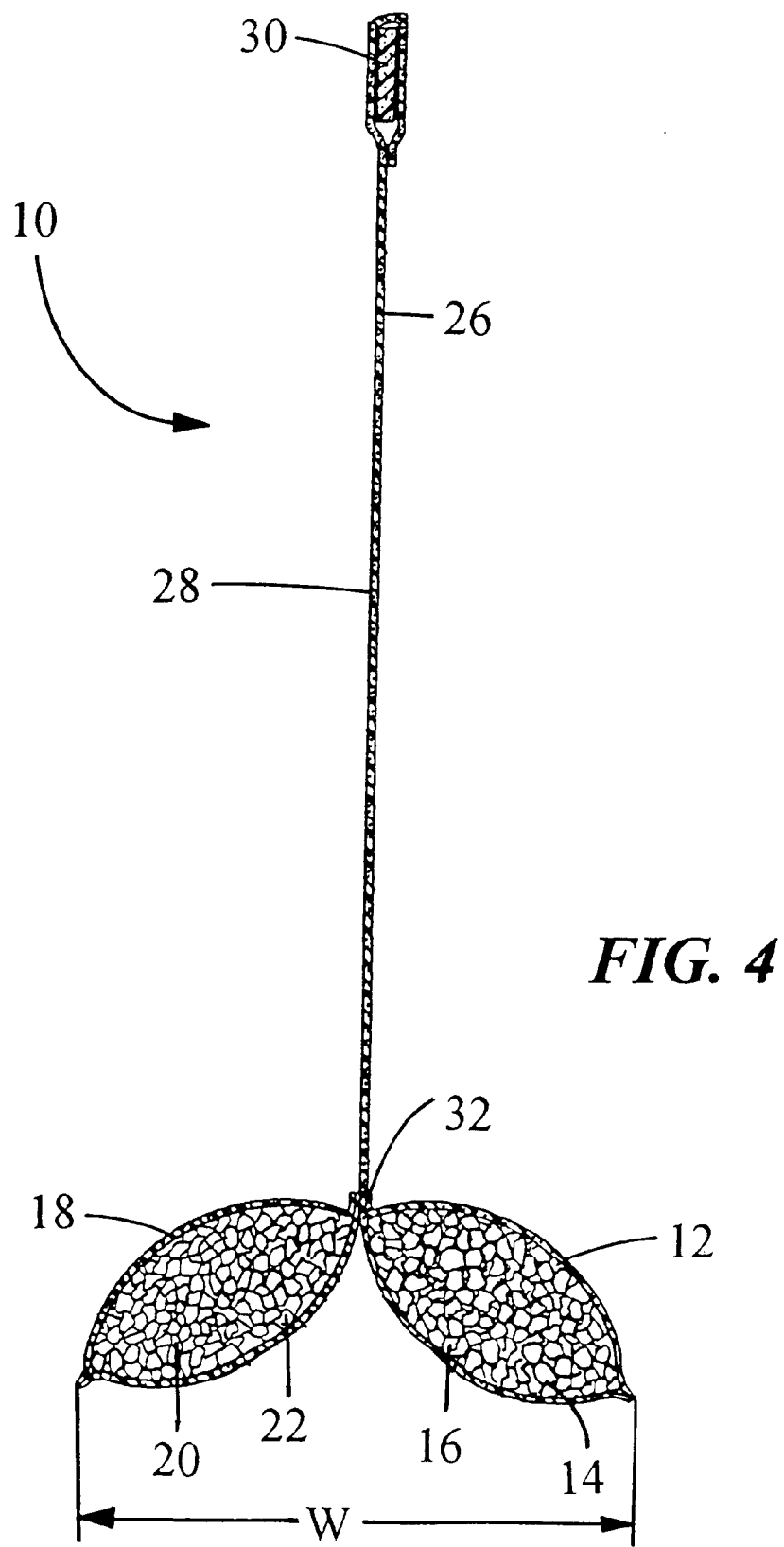
FIG. 4 is a cross-sectional view of the artificial seaweed device of FIG. 1 taken along the line 4—4.

As FIG. 4 shows most clearly, in preferred embodiments the bipartite anchor unit 24 is improved still further by the construction of each of the first and second anchor members 12 and 18 with elongate, non-round cross sections such as with a generally oval cross section as in FIGS. 1 and 2 or with an eye-shaped cross section as in FIGS. 3 and 4. First and second anchor members 12 and 18 with such cross sections are particularly simple in construction and convenient in transportation because they may be formed as generally rectangular pockets only to assume the oval or eye-shaped cross section seen in the figures upon being filled with particulate anchoring material 16 and 22. Additionally, with anchor members 12 and 18 with generally oval or eye-shaped cross sections, the bipartite anchor unit base width W is widened beyond what it would be with generally round anchor members. Furthermore, the center of gravity of the bipartite anchor unit 24 is lowered so that the artificial seaweed device 10 provides still more resistance to displacement migration and anchor rolling. Still further, as FIG. 3 illustrates, it has been found that flexible, appropriately cross-sectioned anchor members 12 and 18 flatten out to some extent to lie more flatly on the sea floor than round anchor members thereby to allow particulate matter 200 (i.e., ocean sand) to accumulate thereon and to bury the anchor members 12 and 18 to some extent. Particulate matter also has been found to fill in between the first and second anchor members 12 and 18. Over time, this accumulation and filling in have the advantageous result of effectively planting the artificial seaweed device 10 on the sea floor to prevent displacement and rolling most effectively even under severe aquatic conditions.

Although the invention expressly is not limited by any dimensional requirements, the preferred artificial seaweed device 10 illustrated in FIGS. 3 and 4 has anchor members 12 and 18 that are approximately six feet, three inches in length and ten inches wide when lying flat without particulate anchoring material 16 and 22 therein. Each artificial seaweed strip 26 is approximately four inches wide and six feet in actual length. However, in the final artificial seaweed device 10, each artificial seaweed strip 26 is five feet, six inches in effective length because six inches at the free end of the artificial seaweed strip are folded back over a four inch square tab 30 of foamed ionomer resin. To prevent tangling, a space of approximately one-half inch is included between each artificial seaweed strip. Naturally, particular applications of the present invention may require wide variations from the aforementioned dimensions.

The advantages that derive from the unique structure of the artificial seaweed device 10 are supplemented by the properties of the carefully selected materials from which it is constructed. Naturally, the particulate anchoring material 16 and 22 that gives appropriate weight to the first and second anchor members 12 and 18 could be comprised of sand, dirt, sediment, stone, or any other acceptable ballast material. However, research has led to the inventor's discovery that washed stone is ideal. The inventor's research has led to the further realization that approximately sixty pounds of washed stone particulate anchoring material 16 and 22 provides sufficient ballast for preventing unwanted displacement while allowing reasonable handling of the artificial seaweed devices 10 during installation. However, certain applications may demand variation from this weight.

As with the particulate anchoring material 16 and 22, a wide variety of materials would be appropriate for constructing the first and second anchor members 12 and 18 and the plurality of artificial seaweed strips 26. Of course, a threshold requirement is that the material be tough. Also, ideal materials for the artificial seaweed strips 26 have a specific gravity below 1.0, preferably about 0.9. It has been found that sheets of plastic material (i.e., polyethylene and polyurethane) are suitable and are available commercially from a number of suppliers such as E. I. DuPont de Nemours & Co. of Wilmington, Del. under the trademarks TYVEK and TYPAR and A.D.E. Corporation of Chicago, Ill. under the trademarks MUSCEL and NESCEL.

Where they are crafted from a material with a specific gravity less than 1.0, the artificial seaweed strips 26 may themselves function as effective buoyancy means for maintaining the artificial seaweed strips 26 in a generally upright position in water 100. However, affixing a durable, environmentally-safe tab of material with a specific gravity significantly less than 1.0 may ensure proper orientation of the artificial seaweed strips 26 most effectively. Although the prior art has proposed a number of different materials for this purpose (i.e., closed cell, foamed polyethylene), the inventor has discovered that a foamed ionomer resin such as that sold by the E. I. DuPont de Nemours & Co. under the trademark SURLYN is most preferred because it tends to disintegrate over extended time periods (i.e., three to five years).

In use, one end of each of the first and second anchor members 12 and 18 may be closed during manufacture leaving the other end open to allow the anchor members 12 and 18 to be filled with the particulate anchoring material 16 and 22, probably at the site of installation. After the anchor members 12 and 18 are filled, they may be sealed shut. The artificial seaweed device 10 then may be installed on the sea floor such as is illustrated in FIG. 3. Once the device 10 is installed, its artificial seaweed strips 26 perform the dual function of reducing localized water turbulence while acting as a barrier to the transportation of particulate matter by suspension. It has been seen that under such conditions waterborne particulate matter tends to fall to the sea floor around the artificial seaweed device thereby avoiding continued erosion while reversing its previous effects through the accretion of suspended sand particles and the like.

Figure 5:
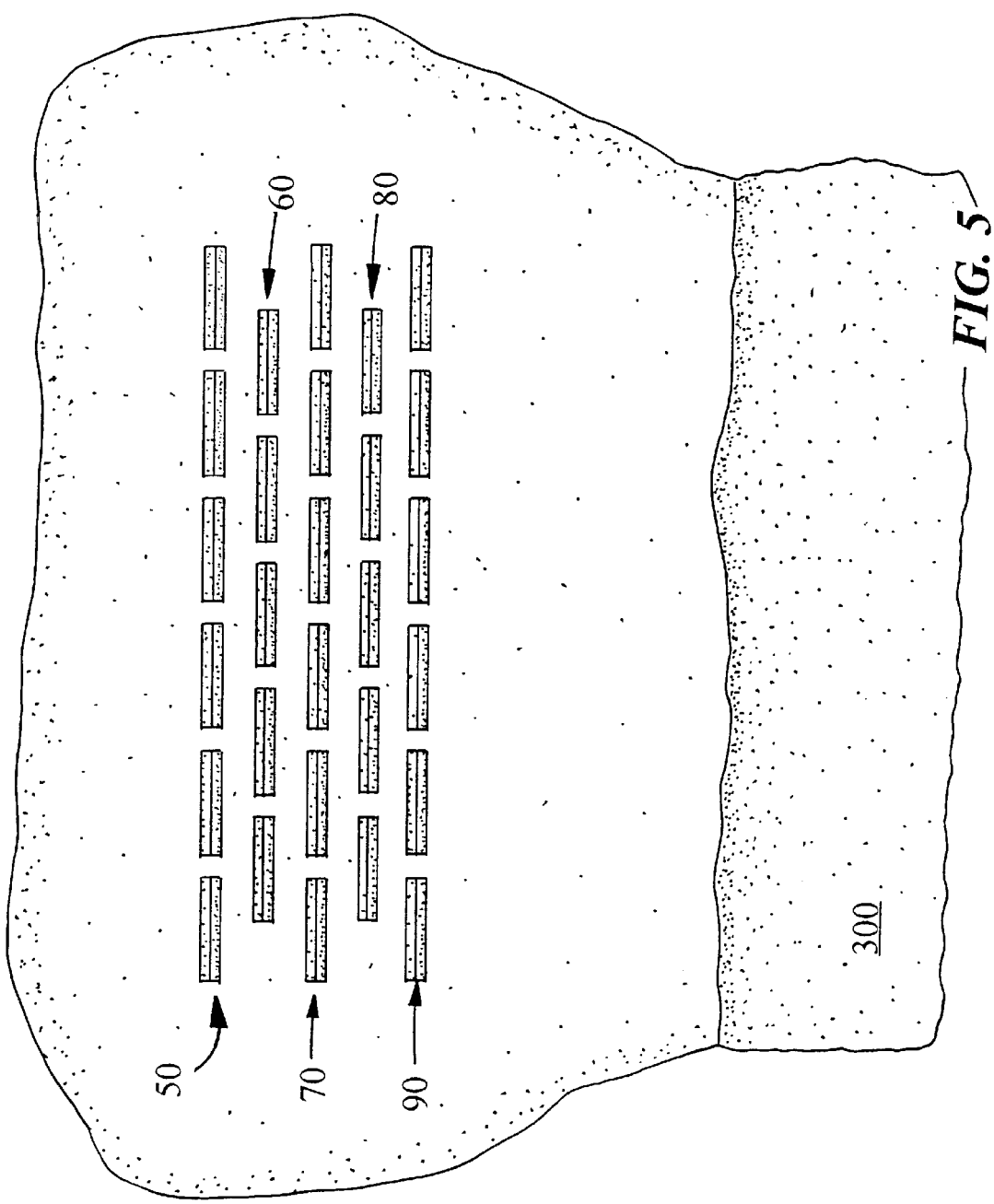
FIG. 5 is a top plan view of an installation of a multiplicity of artificial seaweed devices according to the present invention.

Naturally, a multiplicity of artificial seaweed devices 10 can be located strategically to produce synergistically enhanced particulate accretion. Research has shown that the artificial seaweed devices 10 work best when a multiplicity of rows of artificial seaweed devices 10 are installed in close relation generally tracking the path of a shoreline. Three to seven rows have been found to produce optimal sand accretion. For example, FIG. 5 is illustrative of an appropriate artificial seaweed device 10 installation wherein five rows 50, 60, 70, 80, and 90 of artificial seaweed devices 10 are shown to mirror the shoreline 300.

From the foregoing, it is apparent that the present invention for an artificial seaweed device 10 provides a multiplicity of advantages. For example, the artificial seaweed device may be submersed in a volume of water with waterborne particulate matter quickly and conveniently with little or no underwater assistance. Once the artificial seaweed device 10 is installed, the artificial seaweed strips 26 of the invention reduce localized turbulence to induce particulate matter to settle to the sea floor thereby preventing coastal erosion and enhancing shoreline accretion. Furthermore, by its unique bipartite anchor unit 24 and the advantageous shape of the anchor members 12 and 18, the invention resists undesirable dislocation migration and anchor rolling even under adverse aquatic conditions. Still further, spacing between adjacent artificial seaweed strips 26 minimizes the tendency for entanglement therebetween to ensure that the artificial seaweed device 10 is maintained in a most effective condition.

While the invention has been described with respect to certain preferred embodiments, it will be apparent to those skilled in the art that changes and modifications may be made without departing from the scope of the invention. With this in mind, the following claims are intended to define the scope of protection to be afforded the inventor, and those claims shall be deemed to include equivalent constructions insofar as they do not depart from the spirit and scope of the present invention.

I claim as protected by U.S. Letters Patent:

1. An artificial seaweed device for submersion in a volume of water along a coastline for inhibiting coastal erosion and enhancing accretion of waterborne particulate matter, the artificial seaweed device comprising:

an elongate first anchor member with an open inner volume for containing a volume of particulate anchoring material;

an elongate second anchor member with an open inner volume for containing a volume of particulate anchoring material;

wherein the first anchor member and the second anchor member are coupled together longitudinally to form a bipartite anchor unit with a bipartite anchor unit base width;

at least one elongate and flexible artificial seaweed strip with a fixed end attached to the bipartite anchor unit and a free end distal to the bipartite anchor unit; and a buoyancy means operably associated with the at least one artificial seaweed strip for maintaining the artificial seaweed strip in a generally upright orientation when the artificial seaweed device is submerged in a volume of water.

2. The artificial seaweed device of claim 1 wherein the first anchor member and the second anchor member are each comprised of a flexible tube.

3. The artificial seaweed device of claim 2 wherein the first anchor member and the second anchor member each have an oval cross section thereby broadening the anchor base width and further preventing repositioning of the artificial seaweed device due to adverse aquatic conditions.

4. The artificial seaweed device of claim 2 wherein the first anchor member and the second anchor member each have an eye-shaped cross section thereby broadening the anchor base width and further preventing repositioning of the artificial seaweed device due to adverse aquatic conditions.

5. The artificial seaweed device of claim 2 wherein the first anchor member and the second anchor member are coupled together along a coupling line and wherein a plurality of artificial seaweed strips are attached to the bipartite anchor unit generally colinearly along the coupling line.

6. The artificial seaweed device of claim 1 wherein at least one of the buoyancy means is comprised of a tab of foamed ionomer resin affixed to the free end of the at least one artificial seaweed strip with which the buoyancy means is operably associated.

7. The artificial seaweed device of claim 1 further comprising a volume of particulate anchoring material occupying each of the first and second anchor members.

8. The artificial seaweed device of claim 7 wherein the particulate anchoring material is comprised of washed stone.

9. The artificial seaweed device of claim 8 wherein each anchor member is occupied by approximately sixty pounds of washed stone.

10. The artificial seaweed device of claim 5 wherein there is a space between adjacent artificial seaweed strips.

11. The artificial seaweed device of claim 10 wherein the space between artificial seaweed strips equals approximately one-half of one inch.

* * * * *